(12) United States Patent
Li et al.

(10) Patent No.: US 6,298,315 B1
(45) Date of Patent: Oct. 2, 2001

(54) METHOD AND APPARATUS FOR ANALYZING MEASUREMENTS

(75) Inventors: Peng Li, Fremont, CA (US); Ross Adam Jessen, Savage; Jan Brian Wilstrup, Mounds View, both of MN (US); Dennis Petrich, San Jose, CA (US)

(73) Assignee: Wavecrest Corporation, Edina, MN (US)

( * ) Notice: Subject to any disclaimer, the term of this patent is extended or adjusted under 35 U.S.C. 154(b) by 0 days.

(21) Appl. No.: 09/210,269

(22) Filed: Dec. 11, 1998

(51) Int. Cl.[7] .................................................. G06F 101/14
(52) U.S. Cl. ........................ 702/180; 702/179; 375/371
(58) Field of Search ................................. 702/179, 180, 702/181, 182, 183, 128, 69; 700/51, 52, 93; 375/130, 226, 355, 356, 371

(56) References Cited

U.S. PATENT DOCUMENTS

| 4,676,641 | * | 6/1987 | Bott | 356/336 |
|---|---|---|---|---|
| 4,831,637 | * | 5/1989 | Lawrence et al. | 375/371 |
| 4,908,784 | * | 3/1990 | Box et al. | 702/176 |
| 5,349,612 | * | 9/1994 | Guo et al. | 327/270 |
| 5,367,542 | * | 11/1994 | Guo | 375/359 |
| 5,452,333 | * | 9/1995 | Guo et al. | 375/371 |
| 5,899,959 | * | 5/1999 | Shields et al. | 702/35 |

\* cited by examiner

*Primary Examiner*—Marc S. Hoff
*Assistant Examiner*—Brian Bui
(74) *Attorney, Agent, or Firm*—Merchant & Gould P.C.

(57) ABSTRACT

A method, apparatus, and article of manufacture for analyzing measurements. The invention provides a method for separating and analyzing the components of a distribution, such as deterministic and random components. The method performs the steps of collecting data from a measurement apparatus, constructing a histogram based on the data such that the histogram defines a distribution, fitting tails regions wherein deterministic and random components and associated statistical confidence levels are estimated.

17 Claims, 3 Drawing Sheets

METHOD AND APPARATUS FOR ANALYZING MEASUREMENTS

BACKGROUND OF THE INVENTION

1. Field of the Invention.

This invention relates in general to measurement apparatus; more particularly, to a system and method for analyzing components of a distribution; and more particularly still, to a system and method for analyzing deterministic and random components of signals.

2. Description of Related Art.

A commonly encountered problem in processing measurements is to accurately determine the physical processes and key parameters associated with the distribution. In many cases, a distribution may have both deterministic and random components associated with it. It is essential to extract important information on what kind of physical processes are involved in the distribution and how much each process contributes to the measured distribution.

The present available statistical tools do not allow separation of deterministic and random components. Instead such tools determine a mean and sigma for the entire distribution. The present invention provides a solution to this and other problems, and offers other advantages.

SUMMARY OF THE INVENTION

The present invention discloses a method, apparatus, and article of manufacture for analyzing measurements. The invention provides a method for separating and analyzing the components of a distribution, such as deterministic and random components. The method performs the steps of collecting data from a measurement apparatus, constructing a histogram based on the data such that the histogram defines a distribution, fitting tail regions of the distribution, and calculating the deterministic and random components of the distribution. The tail regions are defined by calculating the first and second order derivative of the histogram. The tail regions are fitted to predefined models and the fitted parameters are determined. The statistical confidence of the fitted parameters is estimated. Although this method may be applied to any distribution, it works particularly well to analyze signal distributions such as jitter signal distributions. The deterministic and random components of jitter can have many uses, including: 1) determining the operation margin for a digital system; 2) calculating and predicting the error probability for a digital system; 3) providing diagnostics for digital system characterization and debug; and 4) providing pass/fail values to production tests.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
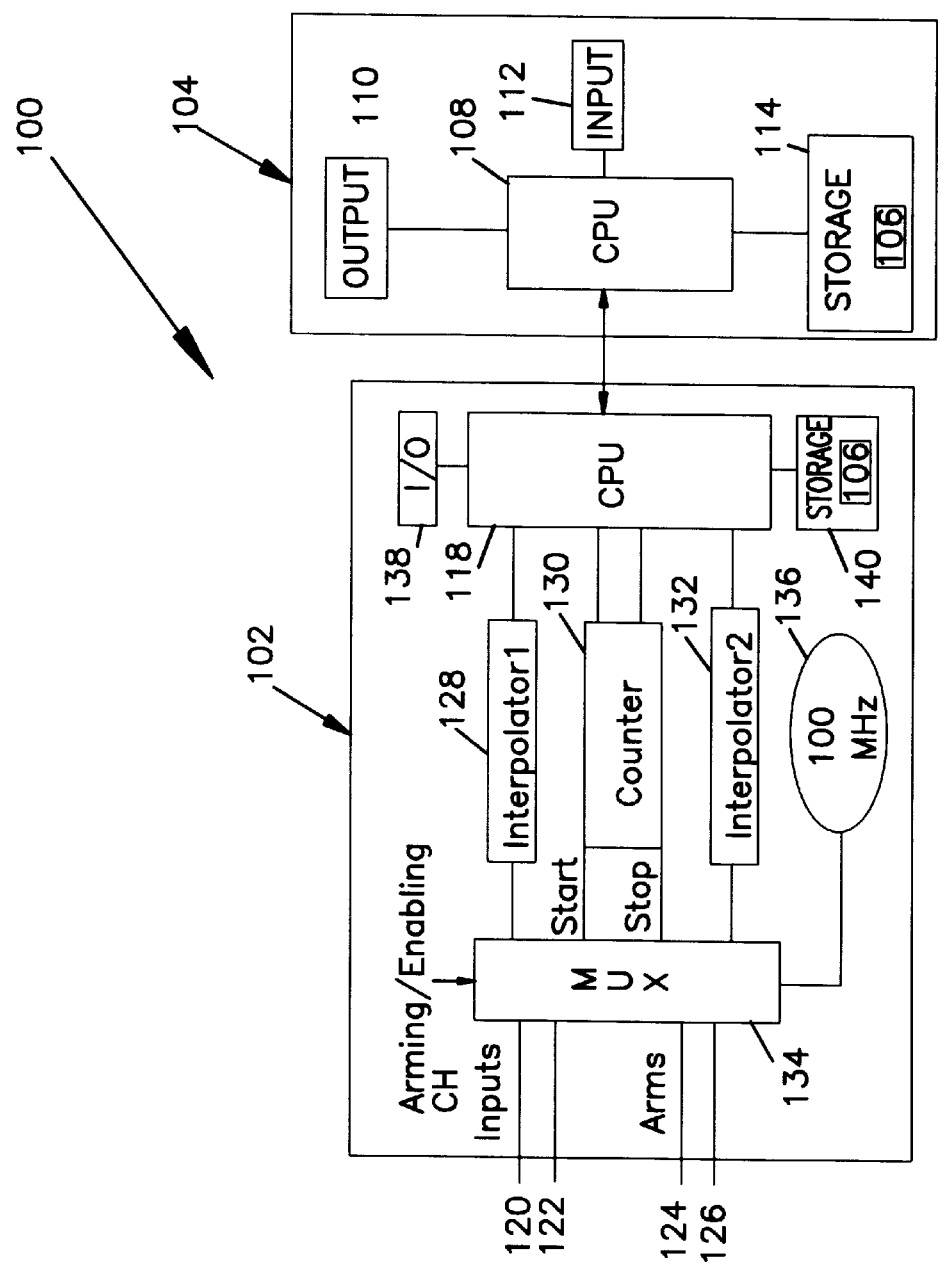
FIG. 1 is an exemplary illustration of a representative hardware environment for a signal analyzing system according to an embodiment of the present invention.

FIG. 1 is an exemplary illustration of a representative hardware environment for a signal analyzing system 100 according an embodiment of the present invention. A typical configuration may include a measurement apparatus 102 that measures the time interval between two events (start and stop) through counters. A measurement apparatus is disclosed in U.S. Pat. No. 4,908,784, which is hereby incorporated by reference. A typical measurement apparatus is the Wavecrest DTS-2075, available from Wavecrest Corporation, Edina, Minn.

Those skilled in the art will recognize that other systems that enable signal/distribution analysis that are based on real world measurement (i.e., measurements that are non-ideal or subject to uncertainty) would be applicable. Generally, this would include any product that can act as a distribution source. These devices include an oscilloscope, Automated Test Equipment (ATE), spectrum analyzer, network analyzer, TIA (time interval analyzer), universal time frequency counter, and modulation domain analyzer. Other devices may include a CCD, an x-ray camera, a MRI, and an ultrasound.

The measurement apparatus 102 interfaces to a workstation 104 and operates under the control of an analysis program 106 resident on the workstation 104. The analysis program 106 is typically implemented through data analysis software. One commercially available analysis software is the Wavecrest Virtual Instrument (VI) software, available from Wavecrest Corporation, Edina, MN. Other analysis software includes LABVIEW, MathCad, MATLAB, Mathematica, among others. The workstation 104 comprises a processor 108 and a memory including random access memory (RAM), read only memory (ROM), and/or other components. The workstation 104 operates under control of an operating system, such as the UNIX® or the Microsoft® Windows NT operating system, stored in the memory to present data to the user on the output device 110 and to accept and process commands from the user via input device 112, such as a keyboard or mouse.

The analysis program 106 of the present invention is preferably implemented using one or more computer programs or applications executed by the workstation 104. Those skilled in the art will recognize that the functionality of the workstation 104 may be implemented in alternate hardware arrangements, including a configuration where the measurement apparatus 102 includes CPU 118, memory 140, and I/O 138 capable of implementing some or all of the steps performed by the analysis program 106. Generally, the operating system and the computer programs implementing the present invention are tangibly embodied in a computer-readable medium, e.g. one or more data storage devices 114, such as a zip drive, floppy disc drive, hard drive, CD-ROM drive, firmware, or tape drive. However, such programs may also reside on a remote server, personal computer, or other computer device.

The analysis program 106 provides for different measurement/analysis options and measurement sequences. The analysis program 106 interacts with the measurement apparatus 102 through the on-board CPU 118. In one embodiment, the measurement apparatus 102 provides arming/enabling functionality such that the apparatus 102 can measure a signal either synchronously or a synchronously. The signal is fed to the channel input arming/enabling controls 120, 122, 124, and 126 to which event that a measurement is made. Counter/interpolators 128, 130, and 132 measure the time elapse between the start and stop events. Interpolators provide fine time resolution down to 0.8 ps. In response to input controls 120, 122, 124, and 126, multiplexer 134 controls the counter/interpolators 128, 130, and 132 based on a clock 136 signal. Clock 136 is typically a precise crystal oscillator.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
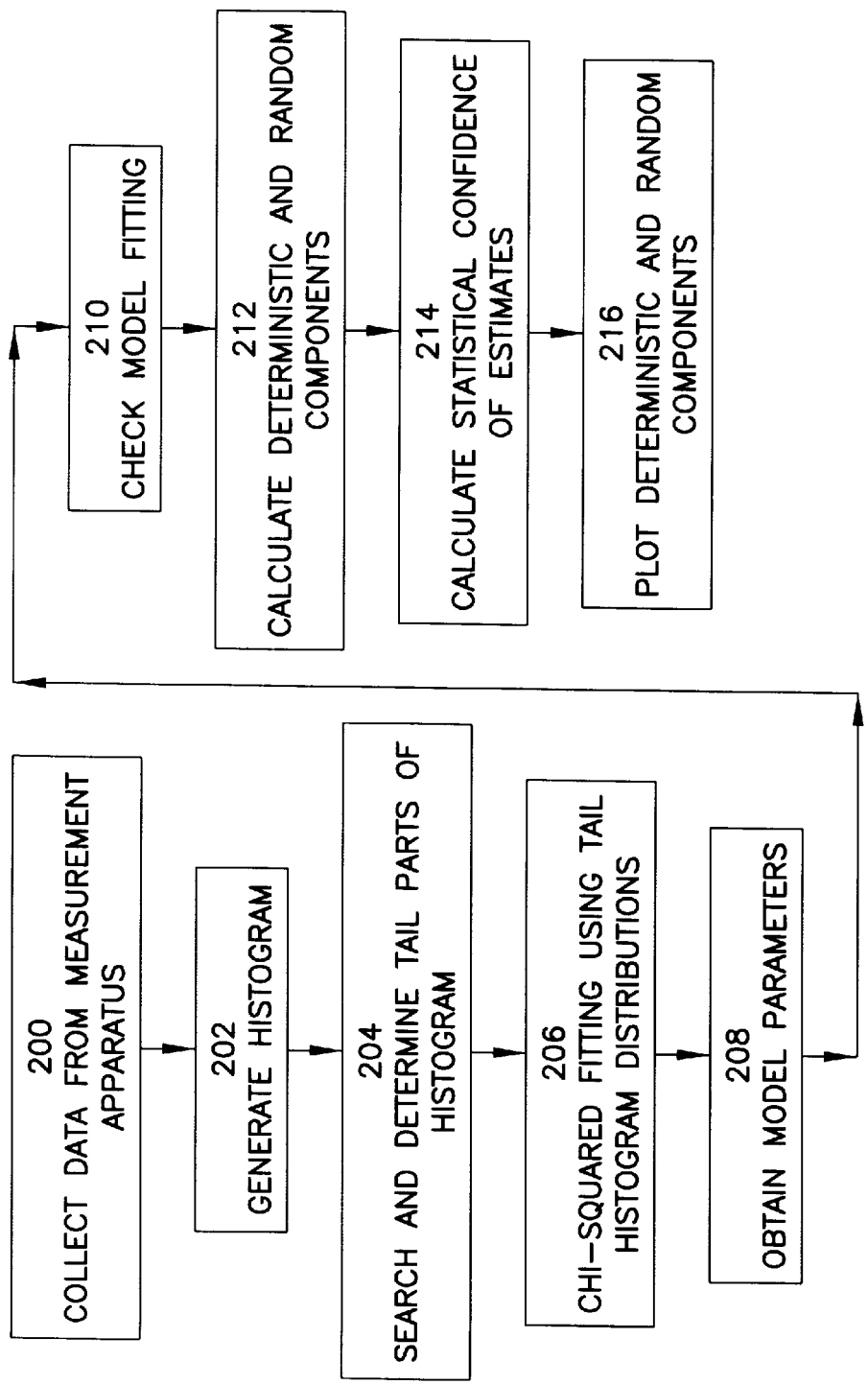
FIG. 2 is a flow diagram illustrating the steps performed by the analysis program according to an embodiment of the present invention.

FIG. 2 is a flow diagram illustrating the steps performed by the analysis program 106 according to one embodiment of the present invention. The present invention is directed towards analyzing the deterministic and random components of a distribution. In one embodiment of the present invention, the analysis program 106 analyzes the jitter of a signal. Jitter in serial data communication is a difference of data transition times relative to ideal bit clock active transition times. Jitter in digital systems is the difference between an ideal clock period and an actual clock period. As in all signals, jitter has deterministic and random components. Deterministic jitter is bounded in its amplitude and can be measured peak to peak. Random jitter is unbounded in its amplitude and Gaussian in nature. Since random jitter is probabalistic, it must be quantified by one sigma of standard deviation estimate. Random jitter is modeled by a Gaussian distribution. The distribution may be the superposition of multiple Gaussian functions. The analysis program separates the deterministic and random components of the jitter.

Block 200 represents the analysis program 106 collecting data from the measurement apparatus 102. The data may be physically based or model based.

Block 202 represents the analysis program 106 generating a jitter histogram by calculating the local statistics in each time bin. A histogram is a statistical representation of the distribution of measured physical parameters. The bin size may be fixed or variable for a given distribution. Mathematically, a histogram indicates how the number of measurements change over the measured parameters. The general procedure for generating a histogram is: 1) measurement apparatus 102 measures a signal parameter (for example, period, frequency, duty cycle, etc.) repeatedly to obtain a statistical sample; 2) analysis program 106 sorts the data in a descending (ascending) order; 3) analysis program 106 automatically defines bin sizes, and the total number of measurements that fall into bin ranges is then accumulated; 4) A data set of the number of measurements versus the various measured parameters, namely histogram, is then composed and plotted graphically. Although the present embodiment describes a histogram, the present invention may apply to any kind of distribution. For example, amplitude versus time (waveform), amplitude versus frequency (spectrum), time versus time (jitter time function), time versus frequency (jitter spectrum).

Figure 3:
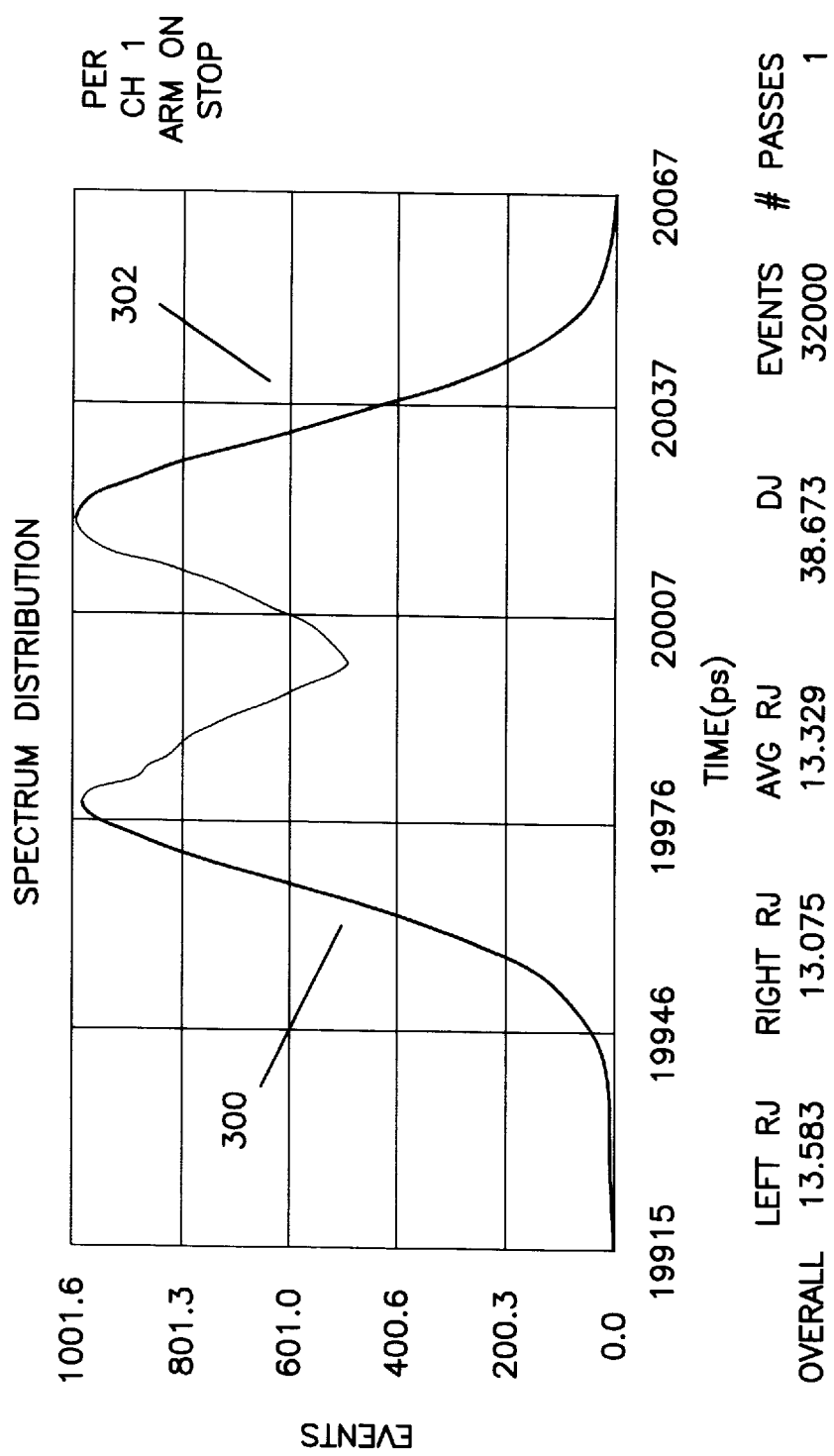
FIG. 3 is a chart illustrating a typical display screen according to an embodiment of the present invention.

Block 204 represents the analysis program 106 searching and determining the tail parts of the histogram by the first and second order derivative method. The tail parts may be found in any isolated area of the distribution. In the exemplary embodiment, the tail part distributions start from the edge of the far left (or right) of the histogram to the first maximum, as is shown in FIG. 3.

Block 206 represents the analysis program 106 starting the $\chi^2$ (chi-squared) method for fitting the tails of the histogram distributions $\chi^2$ is defined as:

$$\chi^2 = \sum_{i=1}^{n} \left( \frac{y_{mod} - y_i}{\Delta y_i} \right)^2 \quad (1)$$

where ymod is the model expected value as defined as:

$$y_{mod} = y_{max} e^{-\left(\frac{x-\mu}{\sqrt{2}\sigma}\right)^2} \quad (2)$$

Where $y_{max}$ is the maximum value, $\mu$ is the mean, and $\sigma$ is the standard deviation, for a Gaussian distribution model. They are the fitting parameters. xi and yi are pairs of data which composite a distribution. (In the case of the histogram, xi is the measured parameter, yi is the accumulated events corresponding to xi). $\Delta y_i$ is the error of yi data. The best fitting parameters will be obtained by minimizing the $\chi^2$. ymod can be any arbitrary function. $\chi^2$ is provides accurate model parameter deduction using measurements which are subject to errors and statistical fluctuation.

Block 208 represents the analysis program 106 obtaining the Gaussian distribution parameters. The parameters $\mu$ and $\sigma$ are obtained for the first (left) and second (right) tails of the distribution.

Block 210 represents the analysis program 106 doing a statistical check of the Gaussian fitting to determine the applicability of the model or the adequacy of the measurements.

Block 212 represents the analysis program 106 calculating the deterministic jitter (DJ) and random jitter (RJ) based on the following formulas: DJ=$\mu$2−1 and RJ=($\sigma$1+$\sigma$2)/2.

Block 214 represents the analysis program 106 calculating the statistical confidence of the DJ and RJ estimates. Methods to calculate a normalized chi squared error are well known in the art.

In the jitter example, the distribution may be multiple Gaussian. In that case, the method may be revised to account for superposition of multiple distributions.

Block 216 represents the analysis program 106 displaying a plot of the RJ and DJ on output 110. When the DJ and RJ are obtained, the total jitter (TJ=DJ+RJ) is ready to calculate.

Another example of the method and apparatus according to this invention is spectral analysis. The analysis program 106 may determine noise processes using spectral distribution data. Important parameters, such as power index and exponential growth rate can be deduced. The Gaussian model applied to the jitter analysis is replaced by power-law and exponentials which are more appropriate for noise processes.

Generally, the distribution fitting analysis performed by the analysis program 106 may be applied to any model. The jitter embodiment described above applies tail fitting to a Gaussian distribution which is appropriate for determining the deterministic and random components of jitter.

It will be appreciated that FIG. 2 represents a methodology, routine, and/or logical flow of program steps which may be implemented to perform the method of the present invention. Other programming steps may be included and such specific logical flow is intended by way of illustration of a preferred routine.

FIG. 3 is a chart illustrating a typical display screen according to an embodiment of the present invention. After analyzing a signal received from the measurement apparatus 102, the analysis program 106 may provide a chart showing the first (left) tail 300 and second (right) tail (302) of a fitted Gaussian distribution.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of analyzing a distribution, comprising steps of:
   (a) collecting data from a data source;
   (b) constructing a histogram based on the data such that the histogram defines a distribution; and
   (c) fitting tail regions of the distribution wherein deterministic and random components of the distribution are estimated.

2. The method of claim 1, wherein the fitting step comprises the steps of:
   (a) finding a first and a second tail region of the distribution;
   (b) fitting the first and second tail region to a predefined first model and second model, respectively; and
   (c) estimating fitted parameters of the first model and the second model.

3. The method of claim 2, further comprising the step of checking the fitting of the first and second tail region.

4. The method of claim 2, further comprising the step of calculating the statistical confidence of the fitted parameters.

5. The method of claim 1, further comprising the step of displaying the deterministic and random components of the distribution.

6. The method of claim 2, wherein the finding step comprises the step of finding the fist and second tail region based on a first derivative and second derivative method.

7. The method of claim 2, wherein the first model and second model are Gaussian models.

8. The method of claim 2, wherein the first model and second model are multiple Gaussian models.

9. The method of claim 2, wherein the model parameters comprise $\mu$ and $\sigma$.

10. The method of claim 9, wherein the deterministic component is calculated according the following formula: $\mu 1 - 2$.

11. The method of claim 10, wherein the random component is calculated according the following formula $(\sigma 1 + \sigma 2)/2$.

12. The method of claim 1, wherein the distribution comprises a signal distribution.

13. The method of claim 12, wherein the signal distribution is a jitter signal distribution.

14. An apparatus for analyzing a distribution, the apparatus comprising:
   (a) a measurement apparatus for collecting data; and
   (b) an analyzing unit, operatively connected to the measurement apparatus, for collecting data from the measurement apparatus, constructing a histogram based on the data such that the histogram defines a distribution, fitting tail regions of the distribution, wherein deterministic and random components of the distribution are estimated.

15. The apparatus of claim 14, wherein the analyzing unit further comprises:
   (a) means for finding a first and a second tail region of the distribution;
   (b) means for fitting the first and second tail region to a predefined first model and second model; and
   (c) means for determining fitted parameters of the first model and the second model.

16. An article of manufacture comprising a program storage medium readable by a computer having a memory, the medium tangibly embodying one or more programs of instructions executable by the computer to perform method steps for performing operations analyzing a distribution, the method comprising the steps of:
   (a) collecting data from a data source;
   (b) constructing a histogram based on the data such that the histogram defines a distribution; and
   (c) fitting tail regions of the distribution wherein deterministic and random components of the distribution are estimated.

17. The article of manufacture of claim 16, wherein the fitting step further comprises the steps of:
   (a) finding a first and a second tail region of the distribution;
   (b) fitting the first and second tail region to a predefined first model and second model; and
   (c) determining the fitted parameters of the first model and the second model.

* * * * *